(12) United States Patent
Klipper et al.

(10) Patent No.: US 7,678,865 B2
(45) Date of Patent: Mar. 16, 2010

(54) MIXTURES OF SUBSTANCES

(75) Inventors: Reinhold Klipper, Köln (DE);
Wolfgang Podszun, Köln (DE);
Hanfried Treffurth, Sandersdorf (DE);
Udo Herrmann, Dormagen (DE);
Hans-Karl Soest, Köln (DE); Ulrich Litzinger, Hachenburg (DE)

(73) Assignee: Lanxess Deutschland GmbH, Leverkusen (DE)

( * ) Notice: Subject to any disclaimer, the term of this patent is extended or adjusted under 35 U.S.C. 154(b) by 806 days.

(21) Appl. No.: 10/544,255

(22) PCT Filed: Feb. 17, 2004

(86) PCT No.: PCT/EP2004/001462

§ 371 (c)(1),
(2), (4) Date: Oct. 31, 2006

(87) PCT Pub. No.: WO2004/074379

PCT Pub. Date: Sep. 2, 2004

(65) Prior Publication Data

US 2007/0084775 A1    Apr. 19, 2007

(30) Foreign Application Priority Data

Feb. 24, 2003 (DE) ............... 103 07 713
Jun. 13, 2003 (DE) ............... 103 26 666

(51) Int. Cl.
*C08F 283/12* (2006.01)

(52) U.S. Cl. .............. 525/479; 523/209; 210/681

(58) Field of Classification Search ........... 525/479; 523/209; 210/681
See application file for complete search history.

(56) References Cited

U.S. PATENT DOCUMENTS

| | | | | |
|---|---|---|---|---|
| 3,299,112 A | | 1/1967 | Bailey ................ 260/448.2 |
| 4,017,427 A | * | 4/1977 | Granda et al. ............. 521/57 |
| 4,207,398 A | | 6/1980 | Riener ...................... 521/31 |
| 4,419,245 A | | 12/1983 | Barrett et al. ............ 210/681 |
| 4,427,794 A | | 1/1984 | Lange et al. .............. 521/28 |
| 4,444,961 A | | 4/1984 | Timm ...................... 526/88 |
| 4,564,644 A | | 1/1986 | Harris ..................... 521/28 |
| 4,952,608 A | | 8/1990 | Klipper et al. ............ 521/32 |
| 5,059,505 A | * | 10/1991 | Kashihara et al. ...... 430/108.11 |
| 5,145,606 A | | 9/1992 | Omure et al. ........... 252/350 |
| 5,147,937 A | | 9/1992 | Frazza et al. ............ 525/243 |
| 5,203,991 A | | 4/1993 | Kutsuna et al. ........ 210/198.2 |
| 5,233,096 A | | 8/1993 | Lundquist ............... 568/727 |
| 5,401,871 A | | 3/1995 | Feldmann-Krane et al. . 556/445 |
| 5,726,210 A | | 3/1998 | Teraue et al. ............ 521/32 |
| 6,228,896 B1 | | 5/2001 | Bachmann et al. ........ 521/33 |
| 6,646,017 B1 | | 11/2003 | Klipper et al. ............ 521/33 |
| 2001/0051664 A1 | | 12/2001 | Bachmann et al. ........ 521/26 |

FOREIGN PATENT DOCUMENTS

| | | |
|---|---|---|
| EP | 062 088 | 10/1982 |
| EP | 1 000 659 | 5/2000 |
| EP | 1 000 660 | 5/2000 |
| GB | 956276 | 4/1964 |

OTHER PUBLICATIONS

Ullmann's Encyclopedia of Industrial Chemistry, 5$^{th}$ Ed. vol. A21, 363-373, VCH Verlagsgesell-Schaft mbH, Weinheim 1992 "3.3.3.3. Suspension Polymerization".

* cited by examiner

*Primary Examiner*—Kuo-Liang Peng
(74) *Attorney, Agent, or Firm*—Nicanor A. Kohncke

(57) ABSTRACT

The present invention relates to mixtures of substances based on organopolysiloxane polyethers and at least one further substance or component, preferably a polymer obtained from aqueous suspension, particularly preferably crosslinked functionalized polystyrene polymer beads, and also to the use of such mixtures of substances based on organopolysiloxane polyether together with crosslinked functionalized polystyrene polymer beads as free-flowing ion exchangers or free-flowing adsorbers, particularly preferably free-flowing monodisperse or heterodisperse anion exchangers or cation exchangers, but also free-flowing mixtures of anion and cation exchangers.

8 Claims, 1 Drawing Sheet

MIXTURES OF SUBSTANCES

CROSS REFERENCE TO RELATED PATENT APPLICATIONS

The present patent application claims the right of priority under 35 U.S.C. §119 (a)-(d) and 35 U.S.C. §365 of International Application No. PCT/EP2004/001462, filed 17 Feb. 2004, which was published in German as International Patent Publication No. WO 2004/074379 A1 on 2 Sep. 2004, which is entitled to the right of priority of German Patent Application No.'s DE 103 07 713.8 and DE 103 26 666.6, each respectively filed on 24 Feb. 2003 and 13 Jun. 2003.

The present invention relates to mixtures of substances based on organopolysiloxane polyethers and at least one further substance or component, preferably a polymer obtained from aqueous suspension, particularly preferably crosslinked functionalized polystyrene polymer beads, and also to the use of such mixtures of substances based on organopolysiloxane polyethers together with crosslinked fuctionalized polystyrene bead polymer beads as free-flowing ion exchangers or free-flowing adsorbers, particularly preferably free-flowing monodisperse or heterodisperse anion exchangers or cation exchangers, but also free-flowing mixtures of anion and cation exchangers.

Mixtures of substances of crosslinked functionalized polystyrene polymer beads and organopolysiloxane polyethers and their uses do not yet belong to the prior art. However, the flowability of ion exchangers, for example, is an important property for their technical handling during further processing, packaging and use. This flowability is of particular importance when the ion exchangers are to be charged into cartridges or small filters via funnels or other filling systems having small outlet orifices. Cartridges and small filters of this type are used, for example, in homes for preparing drinking water or for softening the mains water, to prevent limescale and remove interfering ions.

Conventional ion exchangers generally, after their production, do not have adequate flowability. In particular, monodisperse ion exchangers exhibit poor flowability, which can be ascribed to strong adhesion of the beads to one another because of the formation of regular and tight spherical packings and also to the enclosed residual water. Monodisperse, in the present invention, is used to term those ion exchangers which have a narrow or very narrow particle size distribution.

The production of heterodisperse crosslinked polymer beads is described, for example, in Ullmann's Encyclopedia of Industrial Chemistry, 5th Ed. Vol. A21, 363-373, VCH Verlagsgesellschaft mbH, Weinheim 1992. Sulphonation produces therefrom heterodisperse cation exchangers as described, for example, in DE-A 19 644 227. Heterodisperse gel-type or macroporous anion exchangers are produced therefrom, for example, either using the phthalimide process according to U.S. Pat No. 4,952,608, or using the chloroether process according to U.S. Pat. No. 4,207,398 or U.S. Pat No. 5,726,210.

According to DE-A 19 644 227, heterodisperse cation exchangers are obtained, for example, by dissolving, in a polymerization reactor, a cellulose-based protective colloid in demineralized water and also disodium hydrogen phosphate. The aqueous solution is stirred at room temperature. Monomer mixture consisting of styrene, technical-grade divinylbenzene, dibenzoyl peroxide (75% strength) is then added, the mixture is stirred for 6 hours at 70° C. and for a further 3 hours at 90° C. The resultant polymer beads are washed with water and then dried in a drying cabinet. 78% strength sulphuric acid is placed at room temperature in a reaction vessel which has open access to atmospheric air. To this are added polymer beads. 1,2-dichloroethane is added with stirring and the mixture is stirred for a further 3 hours at room temperature. Sulphuric acid monohydrate is then added. The mixture is heated to 120° C. As early as during the heating, dichloroethane distils off. The mixture is stirred for a further 4 hours at 120° C. After stirring for 3.5 hours at 120° C., air is blown through the suspension at 120° C. for 30 minutes to remove any dichloroethane residues still present.

The suspension is transferred to a column and charged and hydrated from the top using differing sulphuric acids of decreasing concentration and finally with water. Alternatively, all operations are carried out under nitrogen. The contents of DE-A 19 644227 are incorporated into the present application by reference.

Heterodisperse gel-type or macroporous anion exchangers are obtained, for example, by the phthalimide process according to U.S. Pat. No. 4,952,608, the contents of which are incorporated into the present application by reference. In this process, for example, phthalimide and formalin in 1,2-dichloroethane are first introduced and reacted to form N-methylolphthalimide. From this is produced bis(phthalimidomethyl) ether. First oleum, then polystyrene polymer beads crosslinked at 5% by weight are introduced. The suspension is heated to 70° C. and stirred for a further 18 hours. Dichloroethane is removed from the system by distillation. The resultant polymer beads are taken up in water, sodium hydroxide solution is added and the mixture is treated for 8 hours at 180° C. After they are cooled, the resultant aminomethylated polymer beads are extracted with water by washing.

Heterodisperse gel-type or macroporous anion exchangers are, however, also obtained, for example, by the chloroether process according to U.S. Pat. No. 4,207,398 or U.S. Pat No. 5,726,210 by allowing a haloalkylating agent to act on an aromatic crosslinked copolymer, removing unreacted haloalkylating reagent from the aromatic crosslinked haloalkyl-containing copolymer and then reacting the latter with an amine in the presence of water and a water-soluble inorganic salt. The contents of U.S. Pat. No. 4,207,398 and U.S. Pat. No.5,726,210 are incorporated into the present application by reference.

The production of monodisperse ion exchangers is described, for example, in the patent documents U.S. Pat. No. 4,444,961, EP-A 0 046 535, EP-A 0 098 130, EP-A 0 101 943, EP-A 0 418 603, EP-A 0 448 391, EP-A 0 062 088 and U.S. Pat. No. 4,419,245, the contents of which, with respect to the production of monodisperse ion exchangers, are incorporated into the present application by reference.

Monodisperse ion exchangers are produced, for example, in accordance with EP-A 0 046 535, by
a) producing droplets of uniform size from the monomer or polymerization mixture to be polymerized by injection into a continuously fed liquid which is essentially immiscible with the monomer or polymerization mixture;
b) encapsulating these droplets of uniform size in said liquid continuously by microencapsulation processes known per se either directly with a casing stable under the polymerization conditions to be employed, or first encapsulating them with a casing stable to shear forces and, in a second substep, continuously or batchwise curing this casing which is stable to shear forces to form a casing which is stable under the polymerization conditions to be employed;
c) then polymerizing the monomer droplets or polymerization mixture droplets encapsulated with a casing stable under the polymerization conditions to be employed, with the proviso α) that the monomer or the polymerization mixture is injected into the continuously fed continuous phase cocurrently with this;

β) that the droplets are produced and encapsulated in different regions of the reaction vessel;

γ) that the process steps a) and b) are carried out in such a manner that no forces altering the integrity of the droplets act on the droplets from their production up to their encapsulation.

However, monodisperse ion exchangers are also produced, for example, according to U.S. Pat. No. 4,444,961 by (a) forming a monomer jet which has laminar flow properties, defined by a Reynolds number of 120 to 1 200, from a monomer phase by allowing the monomer phase to stream through an orifice into a continuous phase which is immiscible with the monomer phase and which comprises a sufficient amount of a suspension medium for stabilizing drops of the monomer phase;

(b) breaking the monomer jet into drops of uniform size by vibration excitation of the jet, defined by a Strouhal number of 0.15 to 1.5;

(c) subsequently enabling the monomer drops which have a density lower than the density of the suspension medium to ascend through the medium, or the monomer drops which have a density higher than the density of the suspension medium to fall through the medium into a reactor vessel for a batch polymerization in such a manner that essentially no polymerization of monomer takes place before the transfer of the monomer drops into the reactor vessel, and achieving a change in the monomer concentration such that the concentration of monomer drops in the reactor vessel is higher than the concentration of the monomer drops as formed, and is from 0.01 to 20% by volume, based on the total volume of the continuous and monomer phases, at the time point of formation and is from 30 to 60% by volume, based on the total volume of the continuous and monomer phases, at the time point of the polymerization;

(d) polymerizing the suspended drops up to completion with stirring in the batch reactor vessel under conditions which cause no significant coalescence or additional dispersion.

However, monodisperse ion exchangers are also produced, for example, in accordance with EP-A 0 098 130 according to:

a) charging a stirred aqueous suspension of crosslinked seed particles at least essentially having a polymer of (i) a relatively large amount of units formed from monomers which is selected from styrene monomers, aliphatic ethylenically unsaturated monomers and heterocyclic aromatic compounds, and (ii) 0.1 to 3% by weight of crosslinking monomer units in the case of gel-type seed particles or 0.1 to 6% by weight of crosslinking monomer units in the case of seed particles of macroreticular type, the stirred aqueous suspension being formed in the absence of an amount of protective colloid preventing imbibition of the monomer into the seed particles;

b) feeding monomers to the suspended seed particles under polymerization conditions of (I) 0 to 98% by weight of a monoethylenically unsaturated monomer which is selected from styrene monomers, aliphatic ethylenic monomers and heterocyclic aromatic compounds, and (II) 2 to 100% by weight of a polyethylenically unsaturated crosslinking monomer which consists of divinylpyridine or is selected from styrene monomers and/or aliphatic ethylenic monomers, the suspension conditions, the feed rate, the stiring and the polymerization rate being matched to one another in such a manner that a particle agglomeration is avoided, inhibited or kept to a minimum, until the seed particles are swollen to the desired size by imbibition of the monomer or of the monomer mixture, c) continuing the polymerization of the swollen seed particles, with formation of the copolymer particles and d) separating off the copolymer particles from the aqueous suspension medium.

However, alternatively, monodisperse ion exchangers are also obtained in accordance with EP-A 0 101 943 by:

a) forming a suspension of particles of a crosslinked polymer in a continuous aqueous phase, then b) swelling the polymer particles with a first monomer mixture comprising 75 to 99.5 parts by weight of a monoethylenically unsaturated monomer, 0.5 to 25 parts by weight of a polyethylenically unsaturated monomer and a sufficient amount of an essentially water-insoluble free-radical-forming initiator to catalyse the polymerization of the first monomer mixture, and a second monomer mixture, then c) polymerizing the first monomer mixture in the polymer particles until 40 to 95 per cent by weight of the monomers are converted to polymers, then d) continuing the addition of a second monomer mixture to this suspension, the second monomer mixture comprising a monoethylenically unsaturated monomer, but essentially no free-radical-forming initiators, the second monomer mixture being added under conditions which include a temperature sufficient to initiate the free-radical polymerization of the monomer in the second monomer mixture, so that the monomer mixture is imbibed by the polymer particles and the polymerization of the second monomer mixture in the polymer particles is catalysed by the free-radical-forming initiator, which is present in the first monomer mixture, and the monomers of the second monomer mixture, after the polymerization, making up 40 to 90 per cent by weight of the copolymer beads.

However, according to EP-A 0 448 391, monodisperse ion exchangers are also obtained, for example, by the means that a) a water-insoluble monomer which can be polymerized by a free-radical mechanism, or a mixture of such monomers with an aqueous dispersion of seed polymer particles of uniform size is combined until sufficient monomer or mixture of monomers is combined to allow the particles to grow to a selected size and in which the monomer or the mixture of monomers is combined with the aqueous dispersion of seed polymer particles (i) in the presence of a dispersion stabilizer and an oil-soluble free-radical polymerization initiator (ii) at a temperature which is at least as high as that at which the initiator is activated and (iii) at a rate such that an amount of the monomer or mixture of monomers equal to the total initial weight of the seed polymer particles would be combined with the dispersion over a time period of 45 to 120 minutes; and b) the temperature of the monomer or combined monomers and of the particles is kept at least as high as that at which the initiator is activated until all of the monomer is polymerized, these stages being repeated if appropriate until the selected size is equal to the selected final particle size.

However, according to EP-A 0 062 088, monodisperse ion exchangers are also obtained by a) imbibing a monomer mixture of monoethylenically unsaturated monomer and a crosslinker in seed polymers which had been produced in advance from a monoethylenically unsaturated monomer and at least 0.15% by weight of crosslinker, in such a manner that the seed polymers do not dissolve in the monomer feed, the amounts of ethylenically unsaturated monomer and crosslinker for the seed polymer being selected so that the resultant ion-exchanger resins have a high resistance to osmotic shock and have relatively high stability, b) polymerizing the imbibed monomer to form fed beads and c) reacting with corresponding reagents to form active ion exchangers which are made up of these seed polymers.

The said literature references and patents are only to serve as examples of production processes of crosslinked functionalized polystyrene polymer beads which can be used as a further component with the organopolysiloxane polyethers as free-flowing ion exchangers. They are incorporated by reference into the contents of the present application. The organopolysiloxane polyethers are also thoroughly suitable, however, as mixing partners in crosslinked functionalized polystyrene polymer beads which are obtainable by alternative processes, for example by jetting, as are disclosed by U.S. Pat. No. 5,233,096, but also in other resins obtained via aqueous suspension.

Already in EP-A 0 868 212, processes are described for producing free-flowing or temporarily free-flowing strongly acidic cation exchangers produced according to WO 97/23517. The examples imply that it preferably relates to ion exchangers having heterodisperse particle size distribution.

According to a variant of EP-A 0 868 212, the free flowability is achieved by the means that the strongly acidic cation exchanger, after filtration, is treated with aqueous solutions of surface-active substances. Surface-active substances mentioned here are nonionogenic surfactants, such as addition products of ethylene oxide and propylene oxide to natural fatty alcohols of chain lengths $C_{12}$-$C_{14}$ or alkylphenol polyethylene glycol ethers, cationic and amphoteric surfactants or emulsifiers, such as fatty alcohol polyalkylene glycol ethers or anionic surfactants, such as paraffin sulphonates. However, it is disadvantageous in this process that the action of the surfactants is not always lasting, and that the process is less effective in the case of monodisperse ion exchangers. Furthermore, the process of EP-10 A 0 868 212, in the case of anion exchangers and exchanger mixtures, does not lead to flowable products.

The object of the present invention was to find an alternative potential use for organopolysiloxane polyethers, in particular a potential use in combination with polymers which are obtained from aqueous suspension.

The present invention therefore relates to mixtures of substances based on organopolysiloxane polyethers and at least one further substance or component, preferably a polymer obtained from aqueous suspension, particularly preferably a crosslinked functionalized polystyrene polymer bead, and to the use of such mixtures of substances based on organopolysiloxane polyethers with crosslinked functionalized polystyrene polymer beads as free-flowing ion exchangers or free-flowing adsorbers, particularly preferably free-flowing monodisperse or heterodisperse anion exchangers or cation exchangers, but also free-flowing mixtures of anion and cation exchangers.

In a particular embodiment of the present invention, the polymers obtained from aqueous suspension, preferably the crosslinked functionalized polystyrene polymer beads, are treated or mixed with the organopolysiloxane polyether in aqueous suspension with introduction of air, nitrogen or other gases and/or in the presence of an oil.

The inventive mixtures of substances, in particular with crosslinked functionalized polystyrene polymer beads are suitable particularly for ensuring the free flowability of ion exchangers, in particular for macroporous or gel-type anion exchangers or cation exchangers, very particularly preferably for gel-type anion exchangers or gel-type cation exchangers.

Flowability in the context of the invention means that the bed of the ion exchanger can be transported under the influence of gravity without the use of additional forces. In practice, the free flowability is assessed, for example, using a funnel test, as described in EP-A 0 868 212.

The inventive mixtures of substances, in particular with crosslinked functionalized polystyrene polymer beads, permit permanently free-flowing ion exchangers to be established. This is particularly valuable for gel-type ion exchangers which, without special aftertreatment, are generally of only very poor flowability. The use of the organopolysiloxane polyethers is highly suitable in the case of strongly acidic or strongly basic or moderately basic functionalized polystyrene polymer beads and mixtures thereof. The process is particularly highly suitable for producing flowable, crosslinked, functionalized polystyrene polymer beads according to EP-A 1 000 659 (cation exchangers) and according to EP-A 1 000 660 (anion exchangers). Both the contents of EP-A 1 000 659 and also the contents of EP-A 1 000 660 are incorporated into the present application by reference.

According to EP-A 1 000 659, monodisperse gel-type polystyrene polymer beads are obtained by a) forming a suspension of seed polymer in a continuous aqueous phase, b) swelling the seed polymer in a monomer mixture of vinyl monomer, crosslinker and free-radical initiator, c) polymerizing the monomer mixture in the seed polymer, d) functionalizing the formed copolymer by sulphonation, characterized in that the seed polymer is a crosslinked polymer having a swelling index of 2.5 to 7.5 (measured in toluene) and a content of non-volatile soluble fractions (measured by extraction with tetrahydroflran) of less than 1% by weight.

In a particular embodiment of EP-A 1 000 659, the seed polymer used is a crosslinked polymer produced from i) 96.5 to 99.0% by weight of monomer, ii) 0.8 to 2.5% by weight of crosslinker and iii) 0.2 to 1.0% by weight of aliphatic peroxyester as polymerization initiator.

According to EP-A 1 000 660, monodisperse gel-type polystyrene polymer beads are obtained by a) developing a suspension of seed polymer in a continuous aqueous phase, b) swelling the seed polymer in a monomer mixture of vinyl monomer, crosslinker and free-radical initiator, c) polymerizing the monomer mixture in the seed polymer, d) functionalizing the formed copolymer by chloromethylation and subsequent amination, characterized in that the seed polymer is a crosslinked polymer having a swelling index of 2.5 to 7.5 (measured in toluene) and having a content of non-volatile soluble fractions (measured by extraction with tetrahydrofuran) of less than 1% by weight.

In a particular embodiment of EP-A 1 000 660, the seed polymer used is a crosslinked polymer produced from i) 96.5 to 99.0% by weight of monomer, ii) 0.8 to 2.5% by weight of crosslinker and iii) 0.2 to 1.0% by weight of aliphatic peroxyester as polymerization initiator.

The organopolysiloxane polyethers are oligomeric or polymeric compounds containing organopolysiloxane sequences and polyether sequences.

The organopolysiloxane sequences preferably consist of polyalkylsiloxane sequences, very preferably of polymethylsiloxane sequences. The polyether sequences are preferably made up of ethylene oxide, propylene oxide or mixtures of propylene oxide and ethylene oxide. The organopolysiloxane polyethers can have a block or comb structure. Organopolysiloxane polyethers which additionally contain alkyl groups, amino groups, hydroxyl groups, acryloxy groups and/or carboxyl groups are likewise highly suitable.

Polyether-modified trisiloxanes, that is to say organopolysiloxane polyethers containing polysiloxane sequences of three siloxane units, are likewise highly suitable.

Particularly highly suitable organopolysiloxane polyethers in the context of the present invention correspond to the formula I

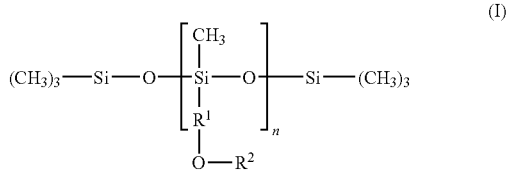

where
$R^1$ is a divalent unbranched or branched alkylene radical having 3 to 6 carbon atoms in the alkylene chain,
$R^2$ is a radical of the formula $(C_mH_{2m}O-)_sR^3$, where m is a number >2.0 and ≤2.5, s is a number from 4 to 21 and $R^3$ is a hydrogen radical, an alkyl radical having 1 to 4 carbon atoms or an acetyl radical, but where, when the radical $R^1$ has only 3 or 4 carbon atoms, a blockwise arrangement of the oxyalkylene units corresponding to the formula $(C_3H_6O-)_p(C_2H_4O-)_q(C_3H_6O-)_rR^3$ shall be maintained, where p is a number from 1 to 3, q is a number from 4 to 15 and r is a number from 0 to 3,
n is a number from 1 to 3, with the proviso that at least 50 mol % of the oxyalkylene groups are oxyethylene groups.

$R_1$ is a divalent unbranched or branched alkylene radical having 3 to 6 carbon atoms in the alkylene chain.

Examples of such radicals are the radicals —$(CH_2)_3$—, —$(CH_2)_4$—, —$(CH_2)_6$—,

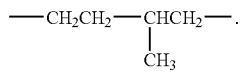

Particular preference is given to the radical —$(CH_2)_3$— and the radical —$(CH_2)_6$—.

$R^2$ can have two different meanings which depend on the number of carbon atoms in the radical $R^1$:

$R^2$ generally has the meaning of the radical $(C_mH_{2m}O-)_s$ $R^3$, where m is a number >2.0 and ≤2.5 and s is a number from 4 to 21. The index m is given by the ratio of oxyethylene units to oxypropylene units in the polyether and can have any desired value >2.0 and ≤2.5. If m has a value of 2.5, this means that, for the case where, except for oxyethylene units, only oxypropylene units are present, that 50 mol % of the oxyalkylene units are oxyethylene units and 50 mol % of the oxyalkylene units are oxypropylene units. The total number of the oxyalkylene units is given by the value of the index s.

The arrangement of the oxyalkylene units can be random or blockwise. However, if the carbon number of the radical $R_1$ is equal to 3 or 4, only the blockwise arrangement of the oxy-alkylene groups is permissible, so that the radical $R^2$ must then correspond to the formula $(C_3H_6O-)_p(C_2H_4O-)_q$ $(C_3H_6O-)_rR^3$, where p is a number from 1 to 3, q is a number from 4 to 15 and r is a number from 0 to 3. The-indices p, q and r are average values here. If the radical $R^1$, has 3 or 4 carbon atoms, the polyoxyalkylene chain of the radical $R^2$ begins with at least one oxypropylene unit. This ensures that, even at a low carbon number of the radical $R^1$, the inventive compounds have the desired stability to hydrolysis.

n gives the number of the difunctional siloxy units and has a value of 1 to 3.

To ensure the water-solubility and wetting properties of the organopolysiloxane polyether, it is necessary to meet the condition that at least 50 mol % of the oxyalkylene groups are oxyethylene groups.

Preferably, the radical -$R^1$—O—$R^2$ has a molar mass of 400 to 700.

$R^3$ is a hydrogen radical, an alkyl radical having 1 to 4 carbon atoms, or an acetyl radical.

Preferably, $R^3$ is a hydrogen radical.

The contents of EP-A 0 612 754 B1 are incorporated into the present application by reference.

Suitable organopolysiloxane polyethers in the context of the present invention are, however, also

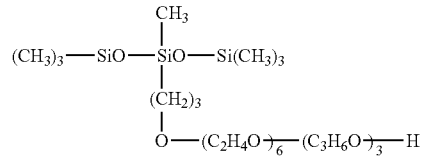

(TEGO®wet 255, from Tego Chemie Service GmbH)

and also the compounds according to U.S. Pat. No. 3,299,112, the contents of which are incorporated into the present application by reference and in which the compounds of the siloxanes containing a group of the formula (A)

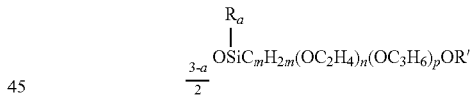

and 1 to 4 groups of the formula (B)

are described, where
a represents 0 to 2
b represents 2 to 3
R represents methyl or ethyl
R' represents an alkyl group having 1 to 4 carbon atoms
m represents 2 to 4
n represents 4 to 17
p represents 0 to 5,
the ratio n to p is at least 2 to 1
n+p represents 4 to 17 and the alkoxypoly(ethyleneoxy) group from silicon atom of (A) is bound via at least 2 carbon atoms to a $C_mH_{2m}$ group.

Very particularly highly suitable organopolysiloxane polyethers in the context of the present invention correspond to the formulae II, III and IV.

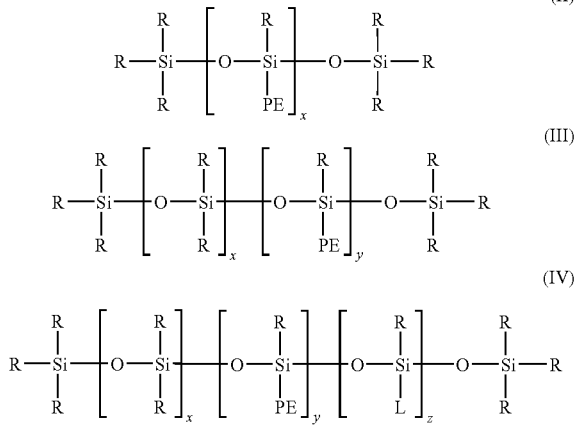

where

PE represents $(CH_2)_3-O-(C_2H_4O)_n(C_3H_{6O})_m-CH_3$ where n, m independently of one another represent an integer from 1 to 100, X represents 1 to 200, preferably 1 to 25, Y represents 1 to 50, preferably 2 to 10, Z represents 1 to 50, preferably 2 to 10, L represents $C_2$ to $C_{18}$-alkyl, preferably $C_2$ to $C_8$-alkyl and R represents $C_1$ to $C_4$-alkyl, preferably $C_1$ to $C_5$-alkyl, particularly preferably ethyl or methyl, very particularly preferably methyl, as described in the product catalogue from Degussa Performance Chemicals, Goldschmidt Industrial Specialities, Product Catalogue Functional Materials Inv. No. 31-01 of 02/2002.

Especially preferably, organopolysiloxane polyethers to be used according to the invention have the formulae

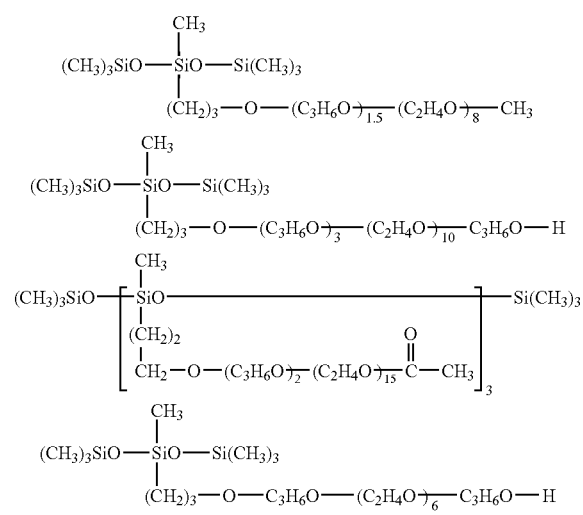

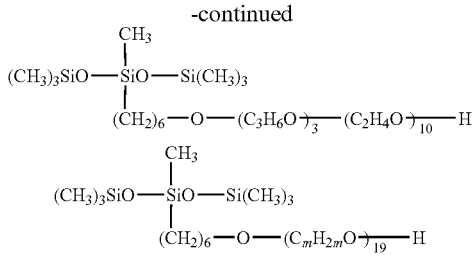

where
m represents 2 or 4.

The organopolysiloxane ethers from Degussa are marketed under the brand name Tegopren®. Especially preferably, according to the invention, those which are suitable for crosslinked functionalized polystyrene polymer beads are Tegopren® 5840 and Tegopren® 5847.

The molar masses (weight averages) of the organopolysiloxane polyethers which are suitable according to the invention are 200 to 20 000, preferably 300 to 3 000, particularly preferably 400 to 1 000.

The organopolysiloxane polyethers are used in an amount of 0.4 g to 15 g, preferably in an amount of 1 g to 8 g, per liter of crosslinked functionalized polystyrene polymer beads.

The crosslinked functionalized polystyrene polymer beads can be treated with an organopolysiloxane polyether as moist product on a suction filter, in aqueous suspension in a reactor, or as a fixed bed or fluidized bed in a column. Preferably, the treatment is performed in a column, the organopolysiloxane polyether being added dissolved in 0.2 to 10 l of water, preferably 0.3 to 3 l of water.

It has proved to be very expedient to pass air, nitrogen or another inert gas through the aqueous suspension during the treatment. In this manner, ion exchangers having particularly favourable flow properties are obtained.

In a particular embodiment of the present invention, the crosslinked functionalized polystyrene polymer beads are treated with organopolysiloxane polyether in the presence of an oil. The oil decreases foam formation during the use of air or nitrogen and does not impair the action of the organopolysiloxane polyether.

As oil, use is made of substances based on organic oils, organically modified siloxanes, silicones, mineral oils, polyethers and other hydrophobic substances. Preferably, mineral oils or silicone oils based on polydimethylsiloxane are used. Mixtures of different oils are also highly suitable.

The oils are used in an amount of 0.2 g to 8 g, preferably in an amount of 0.5 g to 4 g, per liter of crosslinked functionalized polystyrene polymer beads.

The free-flowing mixtures of substances obtainable according to the invention, in particular the free-flowing monodisperse or heterodisperse ion exchangers, have an extraordinarily good flowability which is retained in full even after a relatively long storage time of several months even at elevated temperature (for example 50° C.) or low temperature (for example −10° C.). The products are particularly highly suitable for filling filters and cartridges.

On account of the extraordinary free flowability, the anion exchangers and cation exchangers treated with organopolysiloxane polyethers are suitable for numerous uses.

The present invention therefore also relates to the use of mixtures of substances of organopolysiloxane polyethers and crosslinked polystyrene polymer beads which have been functionalized to form anion exchangers for removing anions from aqueous or organic solutions or their vapours for removing anions from condensates, for removing colour particles from aqueous or organic solutions, for decolorizing and desalting glucose solutions, wheys, dilute gelatin broths, fruit juices, fruit musts or sugars, preferably mono- or disaccharides, in particular fructose solutions, cane sugar, beet sugar solution, for example in the sugar industry, dairies, starch industry and in the pharmaceutical industry, for removing organic components from aqueous solutions, for example humic acids from surface water, for purifying and treating waters in the chemical industry and electronics industry, in particular for producing ultrapure water, in combination with gel-type and/or macroporous cation exchangers for demineralizing aqueous solutions and/or condensates, in particular in the sugar industry.

The present invention further relates to processes for removing anions, preferably anions of strong acids, such as chloride, sulphate, nitrate, from aqueous or organic solutions and their vapours, processes for removing anions, preferably anions of strong acids, such as chloride, sulphate, nitrate, from condensates, processes for removing colour particles from aqueous or organic solutions, processes for decolorizing and desalting glucose solutions, wheys, dilute gelatin broths, fruit juices, fruit musts or sugars, preferably mono- or disaccharides, in particular cane sugar, fructose solutions or beet sugar solutions, for example in the sugar, starch or pharmaceutical industry or in dairies, processes for removing organic components from aqueous solutions, for example humic acids from surface water using mixtures of substances of organopolysiloxane polyether and crosslinked polystyrene polymer beads which have been functionalized to form anion exchangers.

The present invention also relates, however, to the use of mixtures of substances of organopolysiloxane polyethers with crosslinked polystyrene polymer beads functionalized to form cation exchangers for removing cations, colour particles or organic components from aqueous or organic solutions and condensates, for example process condensates or turbine condensates, for softening, in neutral exchange, aqueous or organic solutions and condensates, for example process condensates or turbine condensates, for purifying and treating waters in the chemical industry, the electronics industry and power stations, for demineralizing aqueous solutions and/or condensates, characterized in that these are used in combination with gel-type and/or macroporous anion exchangers, for decolorizing and desalting wheys, dilute gelatin broths, fruit juices, fruit musts and aqueous solutions of sugars, for drinking water treatment or for producing ultrapure water (necessary in microchip production for the computer industry), for the chromatographic separation of glucose and fructose, and as catalysts for various chemical reactions (for example in the production of bisphenol A from phenol and acetone).

The present invention therefore also relates to processes for demineralizing aqueous solutions and/or condensates, for example process condensates or turbine condensates, characterized in that cation exchangers treated according to the invention with organopolysiloxane polyethers are used in combination with heterodisperse or monodisperse gel-type and/or macroporous anion exchangers, combinations of cation exchangers treated according to the invention with organopolysiloxane polyethers with heterodisperse or monodisperse, gel-type and/or macroporous anion exchangers for demineralizing aqueous solutions and/or condensates, for example process condensates or turbine condensates, processes for purifying and treating waters of the chemical industry, the electronics industry and power stations, characterized in that cation exchangers treated according to the invention with organopolysiloxane polyethers are used, processes for softening, in neutral exchange, aqueous or organic solutions and condensates, for example process condensates or turbine condensates, characterized in that cation exchangers treated according to the invention with organopolysiloxane polyethers are used, processes for decolorizing and desalting wheys, dilute gelatin broths, fruit juices, fruit musts and aqueous solutions of sugars in the sugar, starch or pharmaceutical industry or dairies, characterized in that mixtures of substances of organopolysiloxane polyethers and crosslinked polystyrene polymer beads functionalized to form cation exchangers are used.

EXAMPLES

Test of flowability

Figure 1:
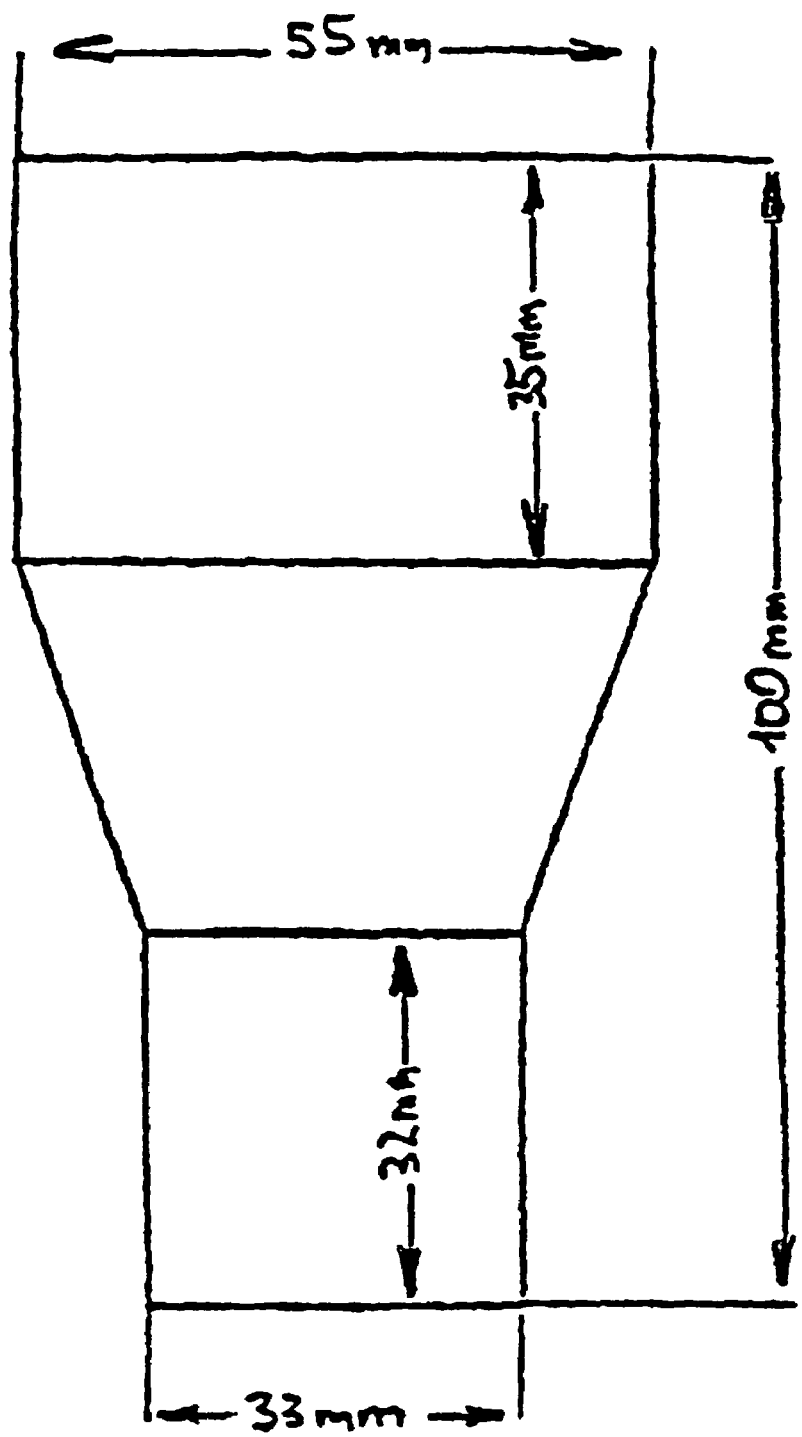
FIG. 1 schematically illustrates the funnel for testing flowability as provided in the Examples.

Description of the funnel for testing flowability

The resin sample under test is charged from the top into the funnel (FIG. 1) which is closed at the bottom, the funnel being completely filled with resin. To test the flowability, the lower opening of the funnel is opened and the time up to complete emptying of the funnel is measured. A resin is flowable if the resin has flowed freely from the funnel in a reasonable time. Reasonable in the context of the present invention is the time which is available in practice for charging a cartridge with resin material. Non-flowable resins remain in the funnel and do not flow out.

Example 1

Comparison Without Surfactant 500 ml of polystyrene polymer beads functionalized to form the cation exchanger and produced according to EP-A 1 000 659 are charged into a glass column having a diameter of 15 cm and a length of 70 cm. 360 ml of water are pumped through from the bottom in 40 minutes. The water is then allowed to flow out again and it is pumped again through the resin. Thereafter air is blown through the suspension for 30 minutes. The entire suspension is placed on a suction filter and filtered off with suction for 5 minutes. A subquantity of the filtered resin mass is charged into the funnel for determining the flowability. The resin mass does not flow out of the funnel.

Example 2

Comparison With Surfactant According to EP-A 0 868 212

500 ml of polystyrene polymer beads functionalized to form the cation exchanger and produced according to EP-A 1 000 659 are charged into a glass column having a diameter of 15 cm and a length of 70 cm. 360 ml of a 0.5% strength by weight aqueous solution of the emulsifier Mersolat K 30®, an anionic surfactant of the paraffin sulphonate type according to EP-A 0 868 212, are pumped through from the bottom in 40 minutes. The solution is then allowed to flow out again and it is pumped again through the resin.

Thereafter air is blown through the suspension for 30 minutes. The entire suspension is placed on a suction filter and filtered off with suction for 5 minutes. A subquantity of the filtered resin mass is charged into the funnel for determining the flowability. The resin mass does not flow out of the funnel.

Example 3 (According to the Invention)

500 ml of non-flowable polystyrene polymer beads functionalized to form the cation exchanger and produced according to EP-A 1 000 659 are charged into a glass column, diameter 15 cm, length 70 cm. 360 g of an aqueous solution containing 0.5% strength by weight alkoxylated organopolysiloxane polyether Tegopren® 5840 and also 0.25% by weight of antifoam are pumped through from the bottom in 40 minutes. The solution is then allowed to flow out again and it is pumped again through the resin. The entire suspension is placed on a suction filter and filtered off with suction for 5 minutes. A subquantity of the filtered resin mass is charged into the funnel for determining the flowability. The resin mass flows completely out of the funnel in 3 seconds.

Example 4 (According to the Invention)

500 ml of non-flowable polystyrene polymer beads functionalized to form the cation 15 exchanger and produced according to EP-A 1 000 659 are charged into a glass column, diameter 15 cm, length 70 cm. 360 ml of an aqueous solution containing 0.5% by weight of alkoxylated organopolysiloxane polyethers Tegopren95847 and also 0.25% by weight of antifoam are pumped through from the bottom in 40 minutes. The solution is then allowed to flow out again and it is pumped again through the resin. Thereafter air is blown through 20 the suspension for 30 minutes. The entire suspension is placed on a suction filter and filtered off with suction for 5 minutes. A subquantity of the filtered resin mass is charged into the funnel for determining the flowability. The resin mass lows completely out of the funnel in 2 seconds.

Example 5

500 ml of a mixture consisting of 250 ml of non-flowable crosslinked polystyrene polymer beads functionalized to form the cation exchanger and produced according to EP-A 1 000 659, and also 250 ml of non-flowable crosslinked polystyrene polymer beads functionalized to form the anion exchanger and produced according to EP-A 1 000 660 are charged into a glass column, diameter 15 cm, length 70 cm. 360 ml of water are pumped through from the bottom in 40 minutes. The water is then allowed to flow out again and it is pumped again through the resin. A subquantity of the filtered resin mass is charged into the funnel for determining the flowability. The resin mass does not flow out of the funnel.

Example 6 (According to the Invention)

500 ml of a mixture consisting of 250 ml of non-flowable crosslinked polystyrene polymer beads functionalized to form the cation exchanger and produced according to EP-A 1 000 659, and also 250 ml of non-flowable crosslinked polystyrene polymer beads functionalized to form the anion exchanger and produced according to EP-A 1 000 660 are charged into a glass column, diameter 15 cm, length 70 cm. 360 ml of an aqueous solution containing 0.5% by weight of alkoxylated organopolysiloxane polyether Tegopren® 5840 and also 0.25% by weight of antifoam are pumped through from the bottom in 40 minutes. The solution is then allowed to flow out again and it is then pumped again through the resin. A subquantity of the filtered resin mass is charged into the funnel for determining the flowability. The resin mass flows out of the funnel in 2 seconds.

The present invention has been described with reference to specific details of particular embodiments thereof. It is not intended that such details be regarded as limitations upon the scope of the invention except to the extent that they are included in the accompanying claims.

What is claimed is:

1. A process for removing anions from an aqueous solution, organic solution, vapor, condensate, or glucose solution comprising:
   treating said aqueous solution, organic solution, vapor, condensate, or glucose solution with an anion exchanger comprising a mixture comprising an organopolysiloxane polyether and a polymer obtained from an aqueous suspension, wherein said polymer comprises a plurality of crosslinked polystyrene polymer beads functionalized to be capable of anion exchange.

2. A process for removing cations, color particles, or organic components from an aqueous solution, organic solution, vapor, or condensate comprising:
   treating said aqueous solution, organic solution, vapor, or condensate with a cation exchanger comprising a mixture comprising an organopolysiloxane polyether and a polymer obtained from an aqueous suspension, wherein said polymer comprises a plurality of crosslinked polystyrene polymer beads functionalized to be capable of cation exchange.

3. The process according to claims 1 or 2, wherein the organopolysiloxane polyether has a molar mass of 200 to 20 000.

4. The process according to claims 1 or 2, wherein the mixture is housed in a filter.

5. The process according to either claims 1 or 2, wherein the mixture is housed in a cartridge.

6. The process according to claims 1 or 2, wherein the mixture is free-flowing, thereby forming a free-flowing mixture.

7. The process according to claims 1 or 2, wherein said plurality of crosslinked polystyrene polymer beads have a monodispersed bead size.

8. The process according to claims 1 or 2, wherein said plurality of crosslinked polystyrene polymer beads have a heterodispersed bead.

* * * * *